Nov. 22, 1966  S. N. McCULLOUGH ETAL  3,286,585
REAR PROJECTION SYMBOL PRESENTATION
Filed Aug. 7, 1961  2 Sheets-Sheet 1
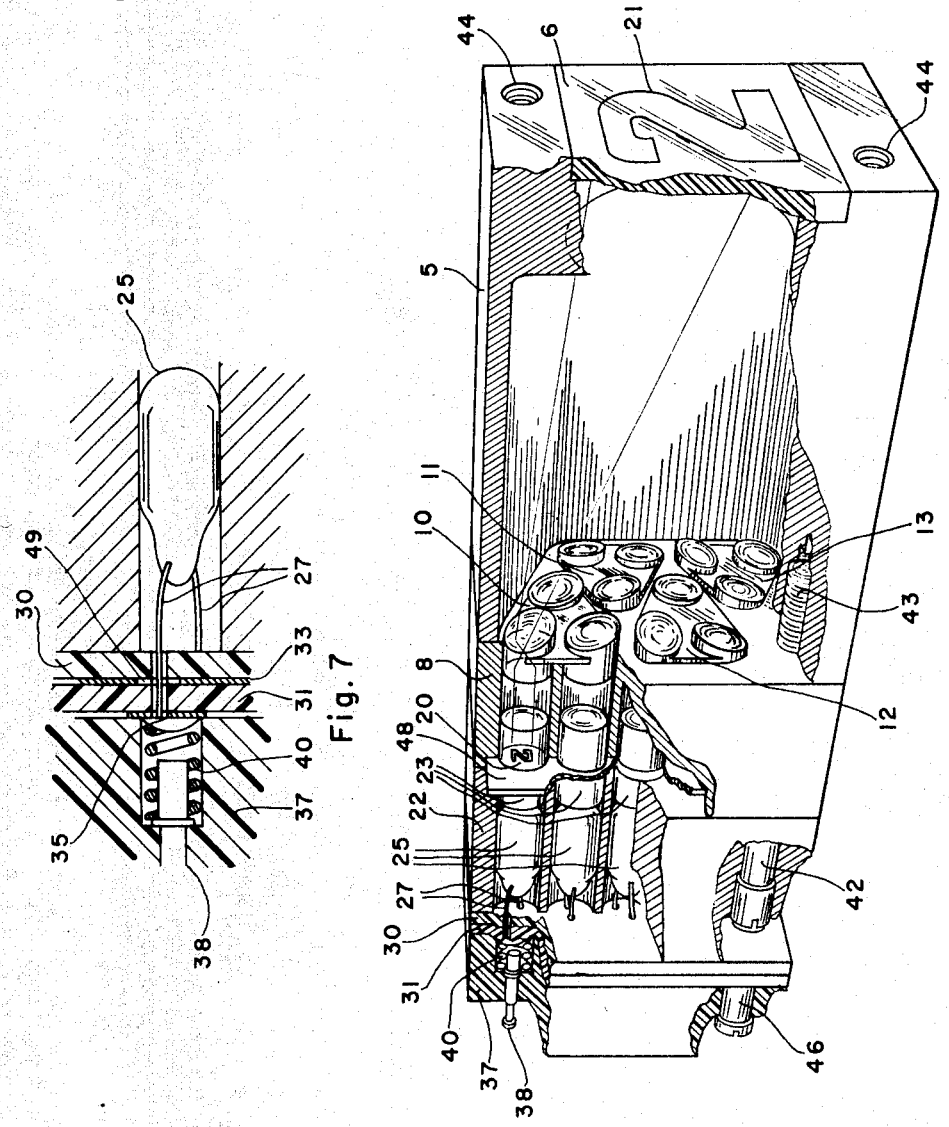
INVENTORS
STUART N. McCULLOUGH
GARRISON G. HOLLOWICH
BY
ATTORNEY

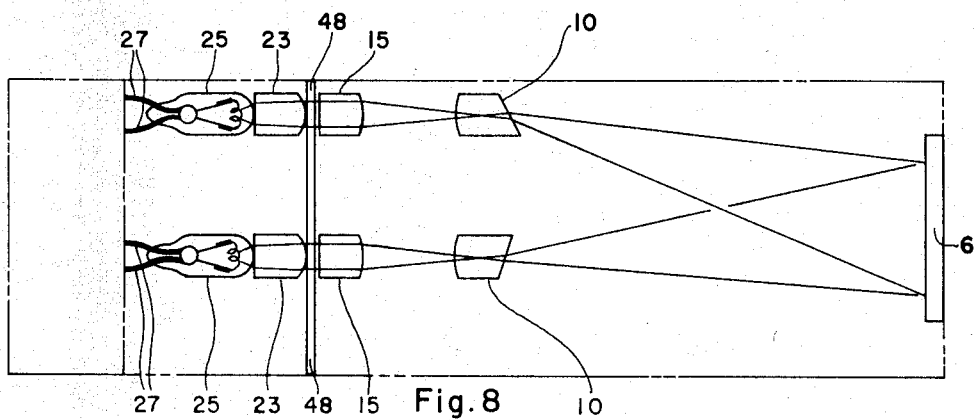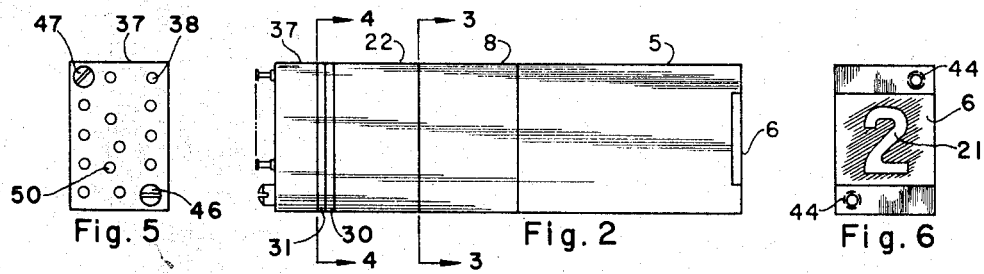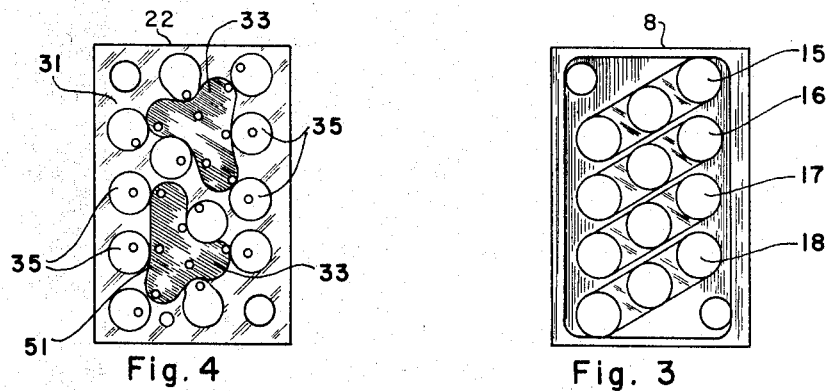

United States Patent Office 3,286,585
Patented Nov. 22, 1966

3,286,585
REAR PROJECTION SYMBOL PRESENTATION
Stuart N. McCullough, Encino, and Garrison G. Hollowich, Los Angeles, Calif., assignors, by mesne assignments, to Shelly Associates, Inc., El Segundo, Calif.
Filed Aug. 7, 1961, Ser. No. 129,880
13 Claims. (Cl. 88—24)

This invention relates to the communication of intelligence in visual form, and particularly to a visual indicating device or module capable of the selective display of any one of a number of symbols or characters, such as letters, numbers, etc. Several modules in array will provide the simultaneous presentation of a plurality of symbols.

In applicants' copending application, Ser. No. 57,735, filed September 22, 1960, which has issued as U.S. Pat. No. 3,096,512 on July 2, 1963, a 43-symbol module is disclosed and claimed. The present invention embodies certain features of the 43-symbol unit but presents distinct advantages when used to display a more limited selection of symbols, such as twelve of the present embodiment.

The module described hereinafter uses individual condensing lenses, field lenses, and combined projection lenses and refracting prisms for each symbol channel. The number and arrangement of refracting surfaces produce a small readout indicator unit of higher optical efficiency than those previously available. The device provides a greater aperture than is normally found in units where multiple channels are used to project symbols on a common screen. This is accomplished by maintaining the optical axes of the individual projectors parallel from each individual light source through the respective condenser, field, and projection lenses and then causing the optical axes of the individual projectors to converge on a common screen by the use of prismatic surfaces.

Another feature of the device is the particular manner of assembling the miniature unbased lamps to a pair of common circuit boards to reduce the space normally allocated to lamp bases and sockets. Each condenser lens refracts the light emitted from the filament of the lamp to form a parallel beam with which to illuminate the reticle. The field lens refracts the light that has passed through the reticle so as to form a real image of the filament of the lamp in the vicinity of the projection lens. The refracting surfaces of the field lens and the projection lens together act to form a real image of the reticle in the plane of the screen.

The projection lenses are equipped with prismatic exit surfaces so designed as to deflect the optical axis of each individual projector channel so that all axes intersect at a common point in the center of a common screen. In this manner, the lenses may be maintained at maximum diameter even though the axes of all channels converge at a common point. This provides a larger aperture for the condenser lens and field lens, which aperture is directly related to the efficiency of the system. The large diameter of the projection lens provides the advantage of accommodating a maximum off-axis excursion of the real image on the lamp filament which makes practical the utilization of lamps with filaments significantly displaced from the central axis.

The principal object of the invention, therefore, is to facilitate the presentation of visual indicia or symbols.

Another object of the invention is to provide an improved economical display module having no moving parts.

A further object of the invention is to provide a visual indicator in which symbols or characters may be displayed in the minimum of space with maximum efficacy.

A better understanding of the invention may be had from the following detailed description when read in connection with the accompanying drawings, in which:

FIG. 1 is a perspective view, partly in cross section, of a display module embodying the invention;
FIG. 2 is a side view of the module shown in FIG. 1;
FIG. 3 is a cross-sectional view taken along the line 3—3 of FIG. 2;
FIG. 4 is a cross-sectional view taken along the line 4—4 of FIG. 2;
FIG. 5 is one end view of the module shown in FIG. 2;
FIG. 6 is the other end view of the module shown in FIG. 2;
FIG. 7 is a detailed view of a lamp mounting; and
FIG. 8 is a diagrammatic view showing two optical channels embodied in the invention.

Referring, now, to the drawings in which the same elements are indicated by the same reference numerals, a hollow rectangular casing 5 has mounted in the end thereof a ground glass or coated plastic viewing screen 6 on which the symbols are imaged as indicated by the numeral "2" illustrated in FIGS. 1 and 6. The next unit of the device is a lens mounting block 8 having twelve holes therethrough in the arrangement shown in FIG. 3. In the right-hand portions of the holes, four triangular groups 10, 11, 12, and 13 of three molded projection lenses having prismatic surfaces facing screen 6 are mounted as shown in FIG. 1. The entrance surface of each lens of each group is convex, each prismatic exit surface being at an angle such as to refract light to the common screen 6. These prismatic surface projection lenses are molded in triangular groups to bring the light beams to a common point in this particular module. However, by rotation of certain groups, two groups may direct light to one point and the other two groups may direct light to another point to provide two images simultaneously on the same screen.

In the left-hand portions of the holes in block 8 are four groups 15, 16, 17, and 18 of three field lenses molded in line with convex surfaces facing toward the projection lenses as shown in FIGS. 1 and 3. The entrance surfaces of the field lenses are flat. Immediately adjacent thereto on a single piece of film 48 are the reticles of the symbols to be projected as shown at 20 in FIG. 1, which, when projected, will appear as shown at 21 in FIGS. 1 and 6.

The next portion of the module is the mounting block 22 having the same arrangement of holes as block 8, the right portions of holes containing four groups 23 of three molded condensing lenses in the same order as the field lens groups 15, 16, 17, and 18. These lenses have convex surfaces facing the field lenses. In the left-hand portion of the holes in mounting block 22 are miniature lamps 25, the light-emitting ends of which are adjacent the entrance surfaces of the condensing lenses 23 and the terminal ends of which are mounted on semi-rigid wires 27 connected to a terminal board assembly having electrical insulating sections 30 and 31. Terminal boards 30 and 31 are cemented together. Common conductor 33 is bonded to board 30 and etched to the desired contour so as to clear lamp leads as shown at 49. Individual conducting terminals 35 (FIGS. 4 and 7) are formed by an etched conductor bonded to board 31. The semi-rigid conductors 27 and the holes in the block 22 maintain the lamps in position, wires 27 being soldered to common conductor 33 or to an individual terminal 35.

The next element of the device is the terminal block 37 which has a plurality of thirteen terminal pins 38 and 50 which extend through holes in the block 37. Surrounding the inner ends of the pins and mounted in recesses around the pins are springs 40, the ends of twelve of which abut the corresponding terminals 35. The spring associated with the thirteenth terminal 50 passes through cutout 51 in board 31 to contact common conductor 33. (See FIGS. 4 and 7). In this manner, the dimensions of the terminal portion of the module are reduced to a minimum.

Referring to FIG. 8, two individual optical channels are shown which, as mentioned above, function to project a bright, sharp image of the symbols 20 on the reticle 48 onto the ground glass observation medium 6.

The various mounting blocks 5, 8, and 22 are held in assembly by screws, one of which is shown at 42, and which are threaded in tapped holes such as shown at 43 in casing 5. The insulating terminal plates 30 and 31 and the terminal mounting block 37 are mounted to the unit by a pair of screws such as shown at 46 and 47 and threaded in the ends of screws 42. The over-all dimensions of the particular unit described are approximately ¾ of an inch x 1⅛ inch x 3½ inches. Tapped holes 44 are provided for panel mounting.

As mentioned above, the particular optical system using a series arrangement of individual condenser, field, and prismatic projection lenses for each channel, the first portion of the optical paths being parallel, provides a visual indicating device of a miniature size with optimum sharpness and brightness of the symbols displayed.

We claim:
1. A visual indicator having a plurality of individual projection paths for directing light to a common area comprising:
   a plurality of lamps, one lamp being provided for each of said paths;
   each path further including a separate plurality of lenses for refracting light in said paths along parallel axes;
   the separate plurality of lenses in each path being substantial optical equivalents of the lenses provided in each of the other paths, the last lens in each of said separate plurality of lenses having a prismatic light exit surface, said prismatic light exit surface in each path being individually aligned at an angle relative to the parallel axis of the respective path to refract light from the respective parallel axis along an axis angularly directed toward a point on the common area.

2. A visual indicator in accordance with claim 1 in which:
   said last lenses in the individual projection paths are molded in separate groups, the entrance surfaces of each of said last lenses having convex projection curvatures, and the prismatic light exit surfaces of said last lenses in each group being individually aligned at a different angle relative to the parallel axes of the respective parallel paths to refract the light from the parallel axes along converging axes toward the center of the common area.

3. A visual indicator in accordance with claim 1 in which the first lenses in the individual projection paths are condensing lenses for refracting light from the respective lamps in parallel beams, and the second lenses in the individual projection paths being field lenses for projecting a real image on the entrance surfaces of each of said last lenses.

4. A visual indicator in accordance with claim 1 including a pair of insulated mounting boards for mounting said plurality of lamps, one of said boards having a common conductor strip thereon for connecting to all of said lamps and the other of said boards having a plurality of insulated conductors, one coupled to each of said lamps.

5. A visual indicator for displaying a selected one of a plurality of images comprising:
   a display screen;
   a plurality of mounting blocks having a serial arrangement of parallel holes to define axially parallel optical paths therethrough;
   a plurality of lamps, one in each of the holes in one of said blocks;
   each optical path including a series of optical elements fixedly disposed in the holes of said blocks, the series of optical elements in each optical path being the substantial optical equivalent of the series of optical elements in each of the other paths;
   the optical elements facing said screen and most remote from said lamps each having a separate prismatic light exit surface that is disposed at a selected angle relative to its respective axially parallel optical path to direct the light from the respective parallel path along an axis directed toward a selected point on said display screen.

6. A visual indicator in accordance with claim 5 in which:
   each of said last-mentioned optical elements has a separate convex lens entrance surface that projects an incident image toward said exit surface.

7. A visual indicator in accordance with claim 6 in which the optical elements nearest to said lamps and most remote from said screen are condenser lenses;
   and in which the remaining ones of said three optical elements included in each of the optical paths are field lenses disposed between the condenser lenses and said lenses with prismatic light exit surfaces;
   and in which said condenser lenses and said field lenses are aligned in common planes normal to the optical paths.

8. A visual indicator for selectively presenting a plurality of luminous symbols on a common display surface comprising:
   a plurality of axially parallel optical projection paths, each including a separate projection lens having a convex entrance surface and a planar prismatic exit surface, the plane of each prismatic exit surface being disposed at an angle relative to the axially parallel optical projection path to refract the image along an axis directed toward a selected point on the common display surface;
   and substantially identical optical means in each of said axially parallel optical paths for selectively focusing an image of a respective one of the symbols on the convex entrance surface of the respective projection lens.

9. A visual indicator for presenting selected ones of a plurality of luminous symbols in a common area on a display surface comprising:
   a plurality of axially parallel and substantially identical projection paths, each including a separate projection lens having a convex lens entrance surface for magnifying and projecting an incident image and a prismatic light exit surface, the prismatic light exit surface angularly disposed relative to the respective axially parallel projection path to refract the image along an axis to a selected point on the common area, and a light source, reticle and lens arrangement for focusing a real image of each symbol on the entrance surface of the respective projection lens in each projection path.

10. A visual indicator for selectively presenting one of a plurality of luminous symbols at a common area on a display surface comprising:
    a plurality of axially parallel and substantially identical projection paths;
    each of said projection paths including a separate projection lens having a separate convex entrance surface for magnifying and projecting an incident image and a separate prismatic exit surface angularly aligned relative to the axis of the parallel path to project the image along an angular path directed toward a selected point on the display surface, a lamp, a condensing lens adjacent said lamp for refracting the light from the lamp into parallel rays along the projection path, a reticle representing one of the symbols disposed in the projection path adjacent said condensing lens to be illuminated by the parallel light rays from the condensing lens, and a field lens disposed along the projection path between the reticle and the projection lens for projecting the image of the illuminated reticle onto the convex entrance surface of the projection lens;

the lamps, the condensing lenses, the reticle, the field lenses, and the convex entrance surfaces of the projection lenses being fixedly aligned relative to one another in common planes normal to the axes of the parallel projection paths.

11. The visual indicator of claim 10 further comprising a casing means for defining the parallel projection paths, said casing including first and second mounting blocks, each block having a corresponding plurality of axially aligned apertures passing entirely therethrough to define the axially parallel projection paths, each of said apertures in the first block mounting the lamp and the condensing lens for each projection path, each of said apertures in the second block mounting the field lens and the projection lens for each projection path, a translucent sheet embodying the symbols to be displayed, said sheet containing the reticle for each of the projection paths, attachment means for holding said first block against said second block and for aligning said sheet between said blocks, and a hollow end section for attaching the display surface to said second block at a fixed distance from the prismatic exit surfaces of the projection lens.

12. A visual indicator of claim 11 further including a separate removable section adjoining said first block and containing electrical couplings for each of said lamps.

13. In a visual display system for presenting various images at a common display area, a plurality of axially parallel and substantially identical projection paths for projecting various images, each of said projection paths including a separate optical element having a prismatic exit surface angularly aligned relative to the respective parallel axis to refract the projected image along an axis directed toward a selected point on the display area.

References Cited by the Examiner

UNITED STATES PATENTS

| | | | |
|---|---|---|---|
| 1,072,426 | 9/1913 | Claflin | 340—378 |
| 2,705,434 | 4/1955 | Hansen | 88—14 |
| 2,917,980 | 12/1959 | Grube et al. | 95—4.5 |
| 2,931,027 | 3/1960 | Blefary et al. | 340—378 |
| 2,981,941 | 4/1961 | Ogle | 340—378 |
| 2,985,873 | 5/1961 | Anthon | 340—378 |

FOREIGN PATENTS 909,353   4/1954   Germany.

OTHER REFERENCES

Mach: The Principles of Physical Optics, Dover Publication, Inc., New York, 1953, page 76.

NORTON ANSHER, *Primary Examiner.*

B. B. MILLER, NEIL C. READ, ROBERT L. EVANS, *Examiners.*

W. C. GLEICHMAN, RICHARD A. WINTERCORN, VANCE A. SMITH, *Assistant Examiners.*